United States Patent [19]

Shiotani et al.

[11] Patent Number: 5,118,782

[45] Date of Patent: Jun. 2, 1992

[54] THERMOTROPIC AROMATIC POLYESTER WHICH IS MELT-PROCESSABLE AT LOW TEMPERATURES AND EXHIBITS LIQUID CRYSTALLINE PROPERTIES

[75] Inventors: Akinori Shiotani; Michinori Suzuki; Fumio Matsuo, all of Ichihara, Japan

[73] Assignee: Ube Industries, Ltd., Japan

[21] Appl. No.: 579,669

[22] Filed: Sep. 10, 1990

[30] Foreign Application Priority Data

Sep. 12, 1989 [JP] Japan .................... 1-234796
Sep. 14, 1989 [JP] Japan .................... 1-236930
Oct. 3, 1989 [JP] Japan .................... 1-256954
Apr. 27, 1990 [JP] Japan .................... 2-110151

[51] Int. Cl.⁵ .................. C08G 63/02; C08G 63/00; C08G 63/18
[52] U.S. Cl. .................. 528/193; 528/125; 528/128; 528/171; 528/173; 528/176; 528/194
[58] Field of Search ............ 528/176, 193, 194, 125, 528/128, 171, 173

[56] References Cited

U.S. PATENT DOCUMENTS 4,608,429 8/1986 Rogers et al. .................. 528/193

Primary Examiner—John Kight, III
Assistant Examiner—T. Mosley
Attorney, Agent, or Firm—Finnegan, Henderson, Farabow, Garrett and Dunner

[57] ABSTRACT

A thermotropic aromatic polyester comprising (a) an aromatic dicarbonyl ingredient comprising recurring aromatic units of the formulae (I) and/or (II):

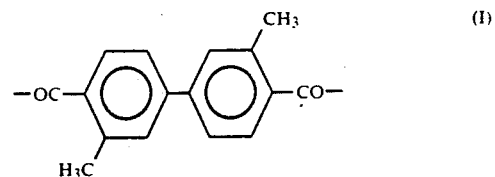

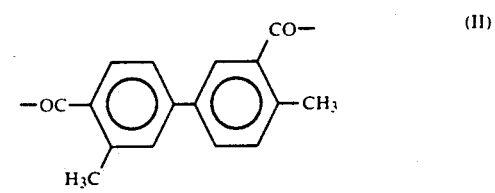

and, optionally, other recurring aromatic dicarbonyl units, (b) an aromatic dioxy ingredient comprising recurring aromatic units of the formula (III)

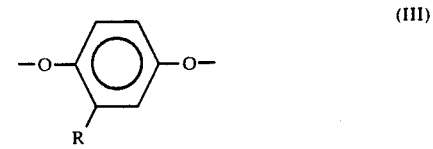

wherein R=—H, $C_{1-8}$ alkyl, aryl or Halogen atom, and optionally, (c) an aromatic oxycarbonyl ingredient comprising recurring aromatic oxycarbonyl units, of, for example, the formula (IV):

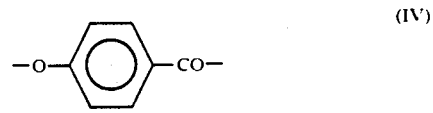

7 Claims, No Drawings

THERMOTROPIC AROMATIC POLYESTER WHICH IS MELT-PROCESSABLE AT LOW TEMPERATURES AND EXHIBITS LIQUID CRYSTALLINE PROPERTIES

BACKGROUND OF THE INVENTION

1) Field of the Invention

The present invention relates to a thermotropic aromatic polyester. More particularly, the present invention relates to a thermotropic wholly aromatic polyester which can be melt-processed at a relatively low temperature of, for example, about 400° C. or less, and exhibits a liquid crystalline property when melted.

2) Description of the Related Arts

Among the various types of engineering plastic resins recently developed, liquid crystalline polymers having an optical anisotropic property are attracting particular attention.

The known liquid crystalline polymers are p-hydroxybenzoic acid homopolymer and terephthalic acid-hydroquinone polymers, and these known polymers have high melting points of 610° C. and 596° C., respectively, and therefore, it is difficult to melt-process these polymers without a decomposition thereof, as mentioned in "Advances in Polymer Science", 60/60, 61 (1984).

Japanese Examined Patent Publication No. 47-47870 discloses a liquid crystalline polymer consisting of a p-hydroxybenzoic acid-terephthalic acid and hydroquinone copolymer, but this polymer has a high melting point of 500° C. or more, and thus has an unsatisfactory melt-processability.

"Brit. Polymer Journal", 132 (1980) discloses various attempts to provide liquid crystalline polymers having a relatively low melting point, and "Makromol. Chem.", 189, 2023 (1988) and "Makromol. Chem. Makromol Symp." 26, 47 (1989) disclose polyesters containing, as a comonomeric component, 2,2'-dimethylbiphenyl-4,4'-dicarboxylic acid. Also, "Journal of Polymer Sci., Part C, Polymer Letters, 25, 11 (1987), and "Makromolecules, 20, 2374 (1987) disclose polyesters containing, as a monomeric component, 2,2'-bis(trifluoromethyl)-biphenyl-4,4'-dicarboxylic acid.

Nevertheless, it was found that, when 2,2'-di-substituted biphenyl-4,4-dicarboxylic acids are employed as a monomeric component, the resultant polymer is disadvantageous in that the coplanality of the polymer is hindered by the substituents of this monomeric component, and thus the crystallinity of the polymer is lowered, and in general, polymers having a lowered crystallinity exhibit an unsatisfactory mechanical strength.

SUMMARY OF THE INVENTION

An object of the present invention is to provide a thermotropic aromatic polyester having a melting point of 400° C. or less and able to be melt-processed at a relatively low temperature.

Another object of the present invention is to provide a thermotropic aromatic polymer exhibiting a liquid crystalline property when melted at a relatively low temperature of 400° C. or less.

The above-mentioned objects can be attained by the thermotropic aromatic polyester of the present invention, which comprises (a) an aromatic dicarbonyl ingredient comprising:

(i) 10 to 100 molar % of at least one member selected from the group consisting of recurring aromatic units of the formula (I):

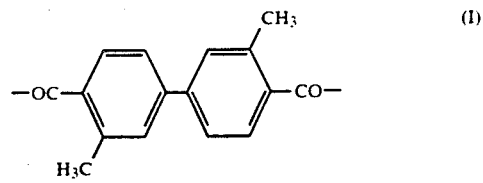

and recurring aromatic units of the formula (II):

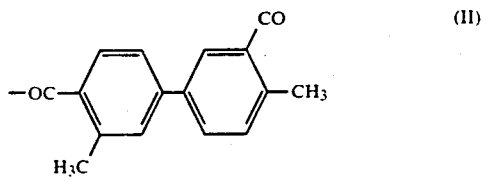

and (ii) 0 to 90 molar % of recurring aromatic dicarbonyl units other than the units of the formula (I) and (II);

(b) an aromatic dioxy ingredient comprising recurring aromatic units of the formula (III):

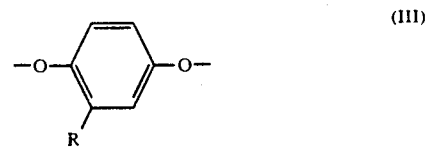

wherein R represents a member selected from the group consisting of a hydrogen atom, alkyl radicals having 1 to 8 carbon atoms, aryl radicals and halogen atoms, the aromatic dicarbonyl ingredient (a) and the aromatic dioxy ingredient (b) being in substantially equimolar amounts to each other; and (c) an aromatic oxycarbonyl ingredient in an amount of 0 to 90 molar % based on the total molar amount of the aromatic ingredients (a), (b) and (c), and comprising at least one member selected from the group consisting of recurring aromatic units having an oxy radical (—O—) and a carbonyl radical (—CO—).

DESCRIPTION OF THE PREFERRED EMBODIMENT

The thermotropic wholly aromatic polyester of the present invention comprises the specific aromatic dicarbonyl ingredient (a), the specific aromatic dioxy ingredient (b) and, optionally, the aromatic oxycarbonyl ingredient as mentioned above, and exhibits an optical anisotropic property (liquid crystalline property) under a polarization microscopic observation when melted.

In the thermotropic aromatic polyester of the present invention, the aromatic dicarbonyl ingredient (a) comprises:

(i) 10 to 100 molar % of at least one member selected from the group consisting of recurring aromatic units of the formula (I):

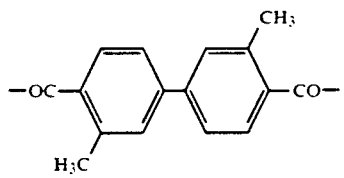

and recurring aromatic units of the formula (II):

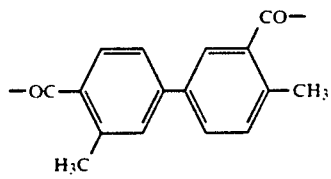

and (ii) 0 to 90 molar % of recurring aromatic dicarbonyl units other than those of the formulae (I) and (II).

The recurring aromatic units of the formula (I) are derived from 3,3'-dimethylbiphenyl-4,4'-dicarboxylic acid or esters or acid halides of the above-mentioned acid, polyesterified with an aromatic diol compound.

The recurring aromatic units of the formula (II) are derived from 3,4'-dimethyl-4,3'-biphenyldicarboxylic acid or esters or acid halides of the above-mentioned acid, polyesterified with an aromatic diol compound.

The 3,3'-dimethylbiphenyl-4,4'-dicarboxylic acid and 3,4'-dimethylbiphenyl-4,3'-dicarboxylic acid can be prepared by an oxidative-coupling reaction of o-methylbenzoic acid, as disclosed in Japanese Unexamined Patent Publication No. 2-115143.

In the aromatic dicarbonyl ingredient (a), the recurring aromatic units (i) of the formula (I) and/or (II) are in an amount of 10 to 100 molar %.

When the amount of the recurring aromatic units (i) of the formula (I) and (II) is less than 10 molar %, the resultant aromatic polyester is disadvantageous in that it has an undesirably high melting point and an unsatisfactorily poor melt-processability.

The other recurring aromatic dicarbonyl units (ii) in the aromatic dicarbonyl ingredient (a) are preferably selected from dicarbonyl residues of terephthalic acid, isophthalic acid, naphtalene-1,5-dicarboxylic acid, 4,4'-biphenyldicarboxylic acid, diphenylether-4,4'-dicarboxylic acid, diphenyl sulfon-4,4'-dicarboxylic acid, diphenylketons-4,4'-dicarboxylic acid, and 2,2'-diphenylpropane-4,4'dicarboxylic acid.

Preferably, the other recurring aromatic dicarbonyl units (ii) are of the formula (V).

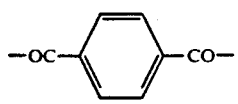

The other recurring aromatic dicarbonyl units (ii) are in an amount of 0 to 90 molar %. If the amount of the units (ii) is more than 90 molar %, the resultant aromatic polyester is disadvantageous in that it has an undesirably high melting point and an unsatisfactorily poor melt-processability.

In the thermotropic aromatic polyester of the present invention, the aromatic dioxy ingredient (b) comprises (iii) recurring units of the formula (III):

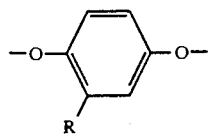

in which formula (III) R represents a member selected from the group consisting of a hydrogen atom, alkyl radical having 1 to 8 carbon atoms, aryl radicals and halogen atoms.

The aromatic dioxy in gradient optionally contains a small amount, for example, 20 molar % or less of recurring aromatic dioxy units other than the units of the formula (III).

The recurring aromatic units (iii) of the formula (III) are derived from unsubstituted hydroquinone or hydroquinone derivatives provided with an alkyl radical having 1 to 8 carbon atoms, for example, methyl, ethyl, propyl or butyl radical, an aryl radical, for example, phenyl radical, or a halogen atom, for example, a chlorine or bromine atom.

The hydroquinone derivatives preferably include methyl hydroquinone, ethylhydroquinone, propyl hydroquinone, butyl hydroquinone, phenyl hydroquinone, halogeno-hydroquinones, and diacetyl derivative of the above-mentioned hydroquinone compounds.

The recurring units (iii) of the recurring aromatic dioxy ingredient may be composed of the same one type of recurring aromatic dioxy units alone or a mixture of two or more different types of recurring aromatic dioxy units.

The recurring aromatic dioxy units other than those of the formula (III) are preferably selected from the group consisting of dioxy residues of resorcine, 2,5-di-tert-butylhydroquinone, 2,3,5-trimethylhydroquinone, 1,5-dihydroxynaphthalene, 2,2-bis(4-hydroxyphenyl)-propane, bis(4-hydroxyphenyl)ketone, bis(4-hydroxyphenyl)sulfon and bis(4-hydroxyphenyl)ether.

The aromatic dicarbonyl ingredient (a) and the aromatic dioxy ingredient (b) are in substantially equimolar amounts to each other.

The aromatic polyester of the present invention contains 0 to 90 molar %, based on the total molar amount of the aromatic ingredients (a) and (b), of the aromatic oxycarbonyl ingredient (c).

When the content of the aromatic oxycarbonyl ingredient (c) is more than 90 molar %, the resultant aromatic polyester is disadvantageous in that the melting point thereof is too high and thus the melt-processing thereof is difficult.

The aromatic oxycarbonyl ingredient (c) comprises at least one member selected from the group consisting of recurring aromatic units having an oxy radical (—O—) and a carbonyl radical (—CO—).

The recurring aromatic units for the aromatic oxycarbonyl ingredient (c) are preferably selected from the group consisting of oxycarbonyl residues of p-hydroxybenzoic acid, m-hydroxybenzoic acid, 4-hydroxy-4'-carboxydiphenyl ether, 4-hydroxy-4'-carboxybiphenyl, and 1-hydroxy-4-naphthoic acid.

The most preferable recurring aromatic oxycarbonyl units are of the formula (IV):

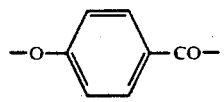
(IV)

which can be derived from p-hydroxybenzoic acid, esters or acid halides of the above-mentioned acid or p-acetoxybenzoic acid.

The aromatic polyester of the present invention can be produced by a conventional ester polycondensation method.

For example, the aromatic polyester of the present invention can be prepared (a) by a polycondensation of an aromatic dicarboxylic acid dichloride, an aromatic diol and, optionally, an aromatic hydroxycarboxylic acid chloride, in the presence of an tertiary amine, (b) by a phenol-eliminating polycondensation of an aromatic dicarboxylic acid diphenyl ester, an aromatic diol and, optionally, an aromatic hydroxycarboxylic acid phenylester, (c) by an acetic acid-eliminating polycondensation of an acetyl derivative of an aromatic dicarboxylic acid, an aromatic diol and, optionally, an aromatic hydroxycarboxylic acid.

Most preferably, the acetic acid-eliminating polycondensation method is used, in which the reaction system is heated at a temperature of from 230° C. to 350° C. for 1 to 10 hours while raising the reaction temperature stepwise to distillate the resultant acetic acid, and thereafter, the pressure of the reaction system is reduced to a level of, for example, about 0.5 torr, to complete the reaction.

The polycondensation can be carried out in the presence or absence of a catalyst. The catalyst preferably comprises tin (II) acetate, antimony trioxide, metallic magnesium, titanium tetrabutoxide, and sodium acetate.

The aromatic polyester of the present invention preferably has an inherent viscosity [$\eta_{inh}$] of 0.5 or more, determined at a concentration of 0.2 g/100 ml in pentafluorophenol at a temperature of 60° C.

The wholly aromatic polyester of the present invention has a relatively low melting point of 400° C. or less, and thus can be smoothly shaped into the form of a bulk shaped article, film or filament by a usual forming method.

Also, the wholly aromatic polyester of the present invention is soluble in an organic solvent, for example, pentafluorophenol or p-chlorophenol, and thus can be converted into a shaped article by a solution-forming method.

The shaped articles are useful in various industries, for example, the electric, electronic, and car industries.

The aromatic polyester of the present invention exhibits a specific liquid crystalline property when melted, and therefore, is useful for producing various shaped polymeric articles having a high degree of molecular orientation and a high mechanical strength.

In a preferable embodiment of the aromatic polyester of the present invention, the aromatic dicarbonyl ingredient (a) consists of at least one member (i) selected from the group consisting of the recurring aromatic units of the formula (I) and the recurring aromatic units of the formula (II), the aromatic dioxy ingredient (b) consists of recurring aromatic units (iii) of the formula (III), and the aromatic oxycarbonyl ingredient (c) consists of the recurring aromatic units of the formula (IV), and in an amount of 1 to 90 molar % based on the total molar amount of the ingredients (a), (b) and (c).

In another preferable embodiment of the aromatic polyester of present invention, the aromatic dicarbonyl ingredient (a) consists of at least one member (i) selected from the group consisting of the recurring units of the formula (I) and the recurring units of the formula (II), and the recurring units (ii) of the formula (V), the molar ratio of the recurring unit (i) to the recurring units (ii) in the aromatic dicarbonyl ingredient (a) being from 10:90 to 99:1; the aromatic dioxy ingredient (b) consists of the recurring units (iii) of the formula (III); and the aromatic oxycarbonyl ingredient (c) is not present.

The recurring units of the formula (V) are derived from terephthalic acid or esters or acid halides of the acid.

In still another preferable embodiment of the aromatic polyester of the present invention, the aromatic dicarbonyl ingredient (a) consists of at least one member (i) selected from the group consisting of the recurring units of the formula (I) and the recurring units of the formula (II) and the recurring units (ii) of the formula (V), the molar ratio of the recurring units (i) to the recurring units (ii) in the aromatic dicarbonyl ingredient (a) being 10:90 or more preferably 10:90 to 99:1; the aromatic dioxy ingredient (b) consists of the recurring units (iii) of the formula (III); and the aromatic oxycarbonyl ingredient (c) consists of the recurring units of the formula (IV), and in an amount of 1 to 75 molar % preferably 1 to 65 molar %, more preferably 1 to 60 molar %, based on the total molar amount of the ingredients (a), (b) and (c).

In a further preferable embodiment of the aromatic polyester of the present invention, the aromatic dicarbonyl ingredient (a) consists of at least one member (i) selected from the group consisting of the recurring units of the formula (I), the recurring units of the formula (II), and the recurring units (ii) of the formulae (V), the total molar % of the recurring units of the formulae (I) and (II) based on the total molar amount of the recurring units of the formulae (I), (II) and (V) being from 10% to 99%; the aromatic dioxy ingredient (b) consists of the recurring units (iii) of the formula (III), and the aromatic oxycarbonyl ingredient (c) consists of the recurring units of the formula (IV), the molar % of the aromatic oxycarbonyl ingredient (c) based on the total molar amount of the aromatic dicarbonyl ingredient (a) and the aromatic oxycarbonyl ingredient (c) being from 1 to 85 molar %.

EXAMPLES

The present invention will be further explained by the following specific examples.

In the examples, the following measurements were carried out.

(1) Optical anisotropy

A specimen was placed in a polarization microscope and heated in a nitrogen gas stream by a heating device (available under the trademark of Heating Device TH600RMS, from LINKAM Co.) at a heating rate of 10° C./min and an optical anisotropy-creating temperature (LC onset (°C.)) of the specimen, at which temperature or higher the specimen exhibits a liquid crystalline property (thermotropic property), was observed and determined by the naked eye.

(2) Thermal decomposition-starting temperature (Td onset (°C.))

A specimen was heated in a nitrogen gas atmosphere at a heating rate of 10° C./min by using a TGA device (available under the trademark of Du Pont 990TGA, from Du Pont), and the change in weight of the sample with a lapse of time was measured.

(3) Melting point (Tm, (°C.))

A specimen was heated in a nitrogen gas atmosphere at a heating rate of 10° C./min by using a DSC device (available under the trademark of Du Pont 990DSC from Du Pont) and the peak in the endotherm was measured.

(4) Inherent viscosity [$\eta_{inh}$]

A sample was dissolved in a concentration of 0.2 g/100 ml in pentafluorophenol at 60° C., the viscosity of the solution was measured in terms of a falling time thereof, and the inherent viscosity of the sample was calculated in accordance with the following equation:

$$\eta_{inh} = \ln (t/t_0)/C$$

wherein $t_0$ represents a falling time of pentafluorophenol, t represents a falling time of the solution, and C represents the concentration of the sample in the solution.

EXAMPLE 1

A stainless steel reaction vessel was attached at the inlet thereof with a three necked glass tube equipped with a stirrer, a conduit connected to a nitrogen gas-supply source, and a Claisen outlet for distillation.

The reaction vessel was charged with 16.217 g (60 m moles) of 3,3'-dimethylbiphenyl-4,4'-dicarboxylic acid and 11.651 g (60 m moles) of hydroquinone diacetate, degassed by using a vacuum pump, and filled with nitrogen gas. The degassing and nitrogen gas-filling operation was repeated four times. Thereafter, the reaction mixture in the reaction vessel was heated at a temperature of 230° C. on a melted tin bath, and then the temperature of the reaction mixture was raised from 230° C. to 300° C. over a time of 2.5 hours, to distill away a by-product consisting of acetic acid.

Then, the reaction mixture was further heated at a temperature of 300° C., under a reduced pressure of 0.5 torr for 30 minutes, and cooled to room temperature while flowing nitrogen gas through the reaction vessel.

The resultant product was crushed and removed from the reaction vessel, washed with dimethylformamide and then with acetone, and dried at a temperature of 100° C. under vacuum.

The resultant polymer was in an amount of 18.98 g which corresponded to a yield of 92%.

The polymer was subjected to the above-mentioned tests and to an elementary analysis.

The results of the tests and analysis are shown in Table 1.

This aromatic polyester exhibited an optical anisotropy at a temperature of 310° C. or more.

EXAMPLE 2

The same procedures as in Example 1 were carried out and except that the hydroquinone diacetate was replaced by 12.493 g (60 m moles) of methylhydroquinone diacetate.

The amount of the resultant polymer and the results of the tests and the analysis are shown in Table 1.

This aromatic polyester exhibited an optical anisotropy at a temperature of 235° C. or more.

EXAMPLE 3

The same procedures as in Example 1 were carried out except that the hydroquinone diacetate was replaced by 16.459 g (60 m moles) of t-butylhydroquinone diacetate.

The amount of the resultant polymer and the results of the tests and the analysis are shown in Table 1.

This aromatic polyester exhibited an optical anisotropy at a temperature of 275° C. or more.

EXAMPLE 4

The same procedures as in Example 1 were carried out except that the hydroquinone diacetate was replaced by 16.217 g (60 m moles) of phenylhydroquinone diacetate.

The amount of the resultant polymer and the results of the tests and the analysis are shown in Table 1.

This aromatic polyester exhibited an optical anisotropy at a temperature of 240° C. or more.

EXAMPLE 5

The same procedures as in Example 1 were carried out except that the hydroquinone diacetate was replaced by 13.718 g (60 m moles) of chlorohydroquinone diacetate.

The amount of the resultant polymer and the results of the tests and the analysis are shown in Table 1.

This aromatic polyester exhibited an optical anisotropy at a temperature of 282° C. or more.

TABLE 1

| | Polymerization Component | | | | | | Thermal Properties | | | | Elementary Analysis | | |
|---|---|---|---|---|---|---|---|---|---|---|---|---|---|
| | Dicarboxylic acid component | | Diol component | | Yield | | Tm | LC onset | Td onset | $\eta_{inh}$ | C (%) | H (%) | Cl (%) |
| Example No. | Type | Amount (m mole) | Type | Amount (m mole) | (g) | (%) | (°C.) | (°C.) | (°C.) | (dl/g) | (Calculation) | | |
| 1 | PA(*)1 | 60 | HQ(*)2 | 60 | 18.98 | 92 | 268 | 310 | 465 | 2.28 | 76.03 (76.73) | 4.59 (4.68) | |
| 2 | " | 60 | MHQ(*)3 | 60 | 20.53 | 95 | (*)8 | 235 | 473 | 2.74 | 77.42 (77.08) | 5.03 (5.06) | |
| 3 | " | 60 | BHQ(*)4 | 60 | 21.97 | 91 | 284 | 275 | 443 | 1.44 | 77.33 (77.98) | 6.10 (6.04) | |
| 4 | " | 60 | PHQ(*)5 | 60 | 22.87 | 91 | 240 | 240 | 443 | 1.53 | 79.24 (80.00) | 4.74 (4.79) | |
| 5 | " | 60 | CHQ(*)6 | 60 | 21.87 | 96 | 220 | 282 | 427 | 2.81 | 69.13 | 4.04 | 9.21 |

TABLE 1-continued

| | Polymerization Component | | | | | | | | | | | |
|---|---|---|---|---|---|---|---|---|---|---|---|---|
| | Dicarboxylic acid component | | Diol component | | | | Thermal Properties | | | | Elementary Analysis | | |
| Example No. | Type | Amount (m mole) | Type | Amount (m mole) | Yield (g) | (%) | Tm (°C.) | LC onset (°C.) | Td onset (°C.) | η_inh (dl/g) | C (%) | H (%) | Cl (%) |
| | | | | | | | | | | | (Calculation) | | |
| | | | | | | | | | | | (69.75) | (3.99) | (9.36) |

Note
(*)¹IPA 3,3'-dimethylbiphenyl-4,4'-dicarboxylic acid
(*)²HQ Hydroquinone diacetate
(*)³MHQ Methylhydroquinone diacetate
(*)⁴BHQ t-Butylhydroquinone diacetate
(*)⁵PHQ Phenylhydroquinone diacetate
(*)⁶CHQ Chlorohydroquinone diacetate
(*)₆No clear peak in endotherm was observed.

EXAMPLES 6 to 12

In each of Examples 6 to 12, the same procedures as in Example 1 were carried out, with the following exceptions.

The reaction mixture was composed of the dicarboxylic acid component, diol component, and oxycarboxylic acid component as shown in Table 2, in the amounts as shown in Table 2.

The polymerization reaction was carried out at a temperature of 230° C. to 250° C. for one hour, then the temperature of the reaction mixture was raised from 250° C. to 300° C., over a time of 2.5 hours, to eliminate acetic acid from the reaction mixture, and the reaction mixture was heated at the temperature of 300° C. under a reduced pressure of 0.5 torr for 30 minutes.

The results of the tests and the analysis, and the yield of the resultant polymer, are shown in Table 2.

EXAMPLES 13 to 20

In each of Examples 13 to 20, the same procedures as in Example 1 were carried out, with the following exceptions.

The reaction mixture was composed of 3,3'-dimethylbiphenyl-4,4'-dicarboxylic acid (PA), terephthalic acid (TPA) and the type of diol compound derivative as shown in Table 3 each in the amount as shown in Table 3.

The polymerization reaction was carried out at a temperature of 230° C. for one hour, the temperature of the reaction mixture was raised from 230° C. to 320° C., over a time of 2 hours, to eliminate acetic acid from the reaction mixture, and the reaction mixture was further heated at a temperature of 320° C. for 2 hours, and then at this temperature under a reduced pressure of 0.5 torr for 30 minutes.

TABLE 2

| | Polymerization Component | | | | | | | | | | | | |
|---|---|---|---|---|---|---|---|---|---|---|---|---|---|
| | Dicarboxylic acid component | | Oxycarboxylic acid component | | Diol component | | | | Thermal Properties | | | | Elementary Analysis |
| Example No. | Type | Amount (m mole) | Type | Amount (m mole) | Type | Amount (m mole) | Yield (g) | (%) | Tm (°C.) | LC onset (°C.) | Td onset (°C.) | η_inh (dl/g) | C % H % (Calculation) |
| 6 | PA | 64 | PBA(*)⁷ | 16 | HQ | 64 | 22.99 | 96 | 262 | 290 | 470 | 2.71 | 76.58  4.66 (76.19) (4.58) |
| 7 | " | 26 | " | 104 | HQ | 26 | 20.50 | 96 | (*)₈ | 280 | 457 | 1.54 | 73.06  3.95 (72.81) (3.91) |
| 8 | " | 40 | " | 40 | HQ | 40 | 17.85 | 96 | (*)₈ | 200 | 453 | 1.08 | 74.77  4.60 (74.99) (4.34) |
| 9 | " | 36 | " | 84 | MHQ | 36 | 22.24 | 97 | 263 | 237 | 460 | 1.88 | 73.40  4.31 (73.97) (4.31) |
| 10 | " | 36 | " | 84 | BHQ | 36 | 22.68 | 93 | (*)₈ | 225 | 447 | 1.54 | 74.28  4.84 (74.70) (4.94) |
| 11 | " | 36 | " | 84 | PHQ | 36 | 21.72 | 94 | (*)₈ | 223 | 447 | 1.78 | 75.14  4.20 (75.99) (4.22) |
| 12 | " | 36 | " | 84 | CHQ | 36 | 22.96 | 97 | (*)₈ | 235 | 416 | 1.89 | 69.94  3.81 (69.86) (3.72) |

Note:
(*)⁷PBA p-Acetoxybenzoic acid
(*)₈No clear peak in endotherm was observed.

The yield of the resultant polymer and the results of the tests and the analysis are shown in Table 3.

TABLE 3

| | Polymerization Component | | | | | | | | | | | |
|---|---|---|---|---|---|---|---|---|---|---|---|---|
| | Dicarboxylic acid component | | Diol component | | | | Thermal Properties | | | | Elementary Analysis | |
| Example No. | PA (m mole) | TPA(*)⁹ (m mole) | Type | Amount (m mole) | Yield (g) | (%) | Tm (°C.) | LC onset (°C.) | Td onset (°C.) | η_inh (dl/g) | C % | H % |
| | | | | | | | | | | | (Calculation) | |
| 13 | 56 | 24 | HQ | 80 | 24.0 | 96 | 380 | 314 | 468 | 2.91 | 75.29 (75.18) | 4.07 (4.38) |

TABLE 3-continued

| Example No. | Polymerization Component | | | | Yield | | Thermal Properties | | | $\eta_{inh}$ (dl/g) | Elementary Analysis (Calculation) | |
|---|---|---|---|---|---|---|---|---|---|---|---|---|
| | Dicarboxylic acid component | | Diol component | | | | Tm (°C.) | LC onset (°C.) | Td onset (°C.) | | C % | H % |
| | PA (m mole) | TPA(*) (m mole) | Type | Amount (m mole) | (g) | (%) | | | | | | |
| 14 | 40 | 40 | HQ | 80 | 22.1 | 95 | 358 | 339 | 473 | 2.56 | 74.00 (73.96) | 4.13 (4.14) |
| 15 | 18 | 72 | MHQ | 80 | 23.79 | 96 | 293 | 291 | 473 | 2.01 | 72.14 (72.48) | 4.31 (4.25) |
| 16 | 40 | 40 | MHQ | 80 | 23.13 | 94 | 203 | 185 | 488 | 2.06 | 74.30 (74.50) | 4.63 (4.61) |
| 17 | 56 | 24 | MHQ | 80 | 24.24 | 93 | (*)8 | 205 | 473 | 2.55 | 75.84 (75.63) | 4.93 (4.81) |
| 18 | 24 | 56 | BHQ | 80 | 23.60 | 90 | 375 | 306 | 465 | 1.99 | 74.31 (74.80) | 5.71 (5.66) |
| 19 | 24 | 56 | PHQ | 80 | 25.60 | 92 | (*)8 | 200 | 450 | 1.95 | 76.87 (77.41) | 4.30 (4.18) |
| 20 | 24 | 56 | CHQ | 80 | 22.50 | 92 | 278 | 270 | 428 | 1.60 | 64.33 (64.39) | 3.22 (3.10) |

Note
(*) TPA Terephthalic acid

EXAMPLES 21 to 26

In each of Examples 21 to 26, the same procedures as in Example 1 were carried out, with the following exceptions.

The polymerization reaction mixture was composed of 3,3'-dimethylbiphenyl-4,4'-dicarboxylic acid (PA), terephthalic acid (TPA), p-acetoxybenzoic acid (PBA) and hydroquinone diacetate (HQ), each in the amount as indicated in Table 4.

In the polymerization reaction, the reaction mixture was heated at a temperature of 230° C. for one hour, further heated from 230° C. to 300° C. over a time of 2 hours, maintained at 300° C. for 0.5 hour, to eliminate acetic acid from the reaction mixture, and then heated at a temperature of 300° C. under a reduced pressure of 0.5 torr for 60 minutes.

The yield of the resultant aromatic polyester and the results of the tests and the analysis are shown in Table 4.

TABLE 4

| Example No. | Polymerization Component (m mole) | | | | Yield | | Thermal Properties | | | $\eta_{inh}$ (dl/g) | Elementary Analysis (Calculation) | |
|---|---|---|---|---|---|---|---|---|---|---|---|---|
| | PA | PBA | TPA | HQ | (g) | (%) | Tm (°C.) | LC onset (°C.) | Td onset (°C.) | | C % | H % |
| 21 | 33 | 44 | 33 | 66 | 22.20 | 90 | 273 | 260 | 470 | 2.17 | 73.36 (73.11) | 4.07 (3.97) |
| 22 | 36 | 18 | 36 | 72 | 21.20 | 91 | 288 | 270 | 468 | 1.62 | 74.03 (73.60) | 4.25 (4.07) |
| 23 | 18 | 84 | 18 | 36 | 19.30 | 94 | 338 | 330 | 466 | 1.80 | 71.85 (72.03) | 3.77 (3.76) |
| 24 | 12 | 40 | 48 | 60 | 20.20 | 99 | 375 | 328 | 470 | 1.40 | 71.43 (71.57) | 3.77 (3.34) |
| 25 | 18 | 40 | 42 | 60 | 19.70 | 93 | 355 | 318 | 475 | 1.47 | 72.15 (72.19) | 3.82 (3.47) |
| 26 | 33.6 | 32 | 14.4 | 48 | 17.40 | 92 | (*)8 | 248 | 453 | 1.37 | 74.26 (74.32) | 4.28 (4.28) |

EXAMPLES 27 to 31

In each of Examples 27 to 31, the same procedures as in Example 21 were carried out, with the following exceptions.

The polymerization reaction mixture was composed of 3,3'-dimethylbiphenyl-4,4'-dicarboxylic acid (PA), terephthalic acid (TPA), p-acetoxybenzoic acid (PBA) and the type of hydroquinone derivative as shown in Table 5, each in the amount indicated in Table 5.

The yield of the resultant aromatic polyester and the results of the tests and the analysis are shown in Table 5.

TABLE 5

| Example No. | Polymerization Component (m mole) | | | | | Yield | | Thermal Properties | | | $\eta_{inh}$ (dl/g) | Elementary Analysis (Calculation) | | |
|---|---|---|---|---|---|---|---|---|---|---|---|---|---|---|
| | PA | PBA | TA | Diol component | | | | Tm (°C.) | LC onset (°C.) | Td onset (°C.) | | C % | H % | Cl % |
| | | | | Type | Amount | (g) | (%) | | | | | | | |
| 27 | 18 | 40 | 42 | MHQ | 60 | 19.90 | 91 | 273 | 265 | 475 | 2.30 | 72.79 (72.50) | 4.24 (4.15) | |
| 28 | 18 | 40 | 42 | BHQ | 60 | 21.50 | 87 | 265 | 268 | 458 | 2.73 | 73.92 (73.44) | 5.42 (5.74) | |

TABLE 5-continued

| Example No. | Polymerization Component (m mole) | | | Diol component | | Yield | | Thermal Properties | | | $\eta_{inh}$ (dl/g) | Elementary Analysis C % H % Cl % (Calculation) | | |
|---|---|---|---|---|---|---|---|---|---|---|---|---|---|---|
| | PA | PBA | TA | Type | Amount | (g) | (%) | Tm (°C.) | LC onset (°C.) | Td onset (°C.) | | | | |
| 29 | 18 | 40 | 42 | PHQ | 60 | 23.68 | 92 | 255 | 245 | 447 | 2.80 | 75.87 (76.02) | 4.08 (4.02) | |
| 30 | 18 | 40 | 42 | CHQ | 60 | 21.80 | 94 | 268 | 270 | 433 | 1.91 | 65.76 (65.73) | 3.24 (2.90) | 9.05 (9.21) |
| 31 | 36 | 18 | 36 | PHQ | 72 | 25.60 | 85 | (*)8 | 279 | 445 | 3.00 | 76.79 (76.82) | 4.27 (4.11) | |

EXAMPLE 32

An SUS 316 stainless steel polymerization vessel having a capacity of one liter was charged with 315 m moles of 3,3'-dimethylbiphenyl-4,4'-dicarboxylic acid, 420 m moles of p-acetoxybenzoic acid, 315 m moles of terephthalic acid, and 642.6 m mole of hydroquinone diacetate.

An operation consisting of a degassing and a nitrogen gas-introduction was repeatedly applied to the polymerization vessel three times. Then the reaction mixture in the vessel was heated from room temperature to 280° C. over a time of 2.5 hours, while flowing nitrogen gas at a flow rate of 200 ml/min through the vessel to eliminate acetic acid from the reaction system, maintained at 300° C. for one hour, then at 300° C. under a reduced pressure of 100 torr for 10 minutes, under 10 torr for 20 minutes, under 0.6 torr for 20 minutes, and finally, under vacuum for 2.5 hours.

After the reaction was completed, the resultant polymer was removed from the vessel through an outlet formed in the bottom of the vessel.

The resultant aromatic polyester had an LC onset of 300° C., a Td onset of 463° C., and an inherent viscosity $[\eta_{inh}]$ of 3.47.

Dumbbell-shaped test pieces (specimens) for tensile test were prepared from a portion of the resultant polymer at a mold temperature of 100° C., at a cylinder temperature of 300° C. under an injection molding pressure of 700 kg/cm², by using a molding machine (available under the trademark of Molding Machine SN60P, from Niigata Tekko K.K.).

The dumbbell-shaped V-type test pieces were subjected to a tensile test in accordance with ASTM D638, at the measurement of number of 5, at a distance of 20 mm between grip members for the test piece, and at a tensile speed of 1 mm/min.

The results are as follows.

| | |
|---|---|
| Tensile strength: | 2,700 kgf/cm² |
| Tensile modulus of elasticity: | 60,000 kgf/cm² |

COMPARATIVE EXAMPLE 1

The same tensile test as in Example 32 was applied to comparative test pieces made, in the same manner as in Example 32, from a comparative aromatic copolyester consisting of a copolycondensation product of p-hydroxybenzoic acid and 2-hydroxy-6-naphthalene-carboxylic acid and available under the trademark of Vectro A-950.

The test results are as follows:

| | |
|---|---|
| Tensile strength: | 2,600 kgf/cm² |
| Tensile modulus of elasticity: | 46,000 kgf/cm² |

EXAMPLES 33 to 44

In each of Examples 33 to 44, the same procedures as those in Example 1 were carried out, with the following exceptions.

The polymerizaton reaction mixture was composed of 3,3'-dimethylbiphenyl-4,4'-dicarboxylic acid (PA), 3,4'-dimethylbiphenyl-4,3'-dicarboxylic acid (QA), p-acetoxybenzoic acid (PBA), terephthalic acid (TPA) and the type of a hydroquinone compound as indicated in Table 6, each in the amount as shown in Table 6.

The polymerization reaction mixture was heated at a temperature of 230° C. for one hour, further heated from 230° C. to 300° C. over a time of 2.5 hours, maintained at 300° C. for 0.5 hour, then heated at 300° under a reduced pressure of 0.5 torr for one hour.

The yield of the resultant polyester and the results of the tests and the analysis are shown in Table 6.

TABLE 6

| Example No. | Polymerization Component (m mole) | | | | Diol component | | Yield | | Thermal Properties | | $\eta_{inh}$ (dl/g) | Elementary Analysis C % H % Cl % (Calculation) | | |
|---|---|---|---|---|---|---|---|---|---|---|---|---|---|---|
| | PA | QA | PBA | TPA | Type | Amount | (g) | (%) | Tm (°C.) | LC onset (°C.) | Td onset (°C.) | | | |
| 33 | 16.5 | 16.5 | 44 | 33 | HQ | 66 | 23.0 | 94 | (*)8 | 316 | 438 | 1.36 | 72.64 (73.11) | 3.98 (3.97) |
| 34 | 18 | 18 | 18 | 36 | HQ | 72 | 21.7 | 94 | (*)8 | 298 | 432 | 1.09 | 73.19 (73.60) | 4.08 (4.07) |
| 35 | 8 | 10 | 84 | 18 | HQ | 36 | 19.3 | 94 | (*)8 | 327 | 442 | 1.28 | 71.60 (72.03) | 3.76 (3.76) |
| 36 | 4 | 8 | 40 | 48 | HQ | 60 | 19.4 | 95 | (*)8 | 397 | 452 | 2.01 | 70.97 (71.36) | 3.67 (3.62) |
| 37 | 10 | 8 | 40 | 42 | HQ | 60 | 19.2 | 98 | (*)8 | 350 | 450 | 1.43 | 71.72 | 3.77 |

TABLE 6-continued

| Example No | Polymerization Component (m mole) | | | | | | Yield | | Thermal Properties | | | $\eta_{inh}$ (dl/g) | Elementary Analysis | | |
|---|---|---|---|---|---|---|---|---|---|---|---|---|---|---|---|
| | PA | QA | PBA | TPA | Diol component Type | Amount | (g) | (%) | Tm (°C.) | LC onset (°C.) | Td onset (°C.) | | C % | H % | Cl % |
| | | | | | | | | | | | | | (Calculation) | | |
| 38 | 18 | 15.6 | 32 | 14.4 | HQ | 48 | 17.7 | 94 | 257 | 269 | 432 | 1.60 | (71.98) 73.19 (73.60) | (3.75) 4.08 (4.07) | |
| 39 | 30 | 26 | 0 | 24 | HQ | 80 | 24.0 | 96 | (*)₈ | 350 | 427 | 1.39 | 75.04 (75.18) | 4.40 (4.38) | |
| 40 | 44 | 20 | 16 | 0 | HQ | 64 | 22.5 | 94 | (*)₈ | 262 | 427 | 1.45 | 75.72 (76.19) | 4.56 (4.58) | |
| 41 | 10 | 8 | 40 | 42 | MHQ | 60 | 20.6 | 94 | 294 | 305 | 452 | 2.11 | 72.27 (72.50) | 4.16 (4.15) | |
| 42 | 10 | 8 | 40 | 42 | BHQ | 60 | 22.3 | 91 | 275 | 291 | 438 | 1.48 | 73.34 (73.86) | 5.27 (5.21) | |
| 43 | 10 | 8 | 40 | 42 | PHQ | 60 | 23.8 | 93 | (*)₈ | 244 | 436 | 1.94 | 75.54 (76.02) | 4.14 (4.02) | |
| 44 | 10 | 8 | 40 | 42 | CHQ | 60 | 21.6 | 93 | 294 | 274 | 410 | 1.40 | 65.06 (65.56) | 3.23 (3.15) | 9.00 (9.19) |

We claim:

1. A thermally anisotropic aromatic polyester consisting essentially of:

(a) an aromatic dicarbonyl ingredient comprising:

(i) 10 to 100 molar % of at least one member selected from the group consisting of recurring aromatic units of the formula (I):

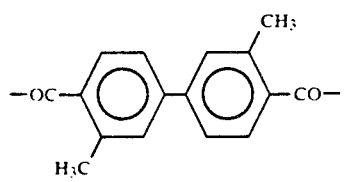

(I)

and the recurring aromatic units of the formula (II):

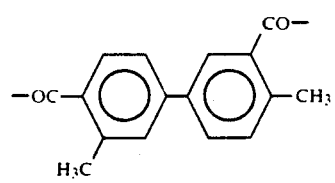

(II)

and (ii) 0 to 90 molar % of recurring aromatic dicarbonyl units other than the units of the formulas (I) and (II);

(b) an aromatic dioxy ingredient comprising recurring aromatic units of the formula (III):

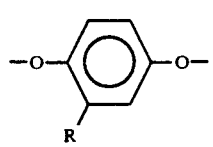

(III)

wherein R represents a member selected from the group consisting of a hydrogen atom, alkyl radicals having 1 to 8 carbon atoms, aryl radicals and halogen atoms; and aromatic dicarbonyl ingredient (a) and said aromatic dioxy ingredient (b) being in substantially equimolar amounts to each other; and (c) an aromatic oxycarbonyl ingredient in an amount of 0 to 90 molar % based on the total molar amount of the aromatic ingredients (a), (b) and (c), and comprising at least one member selected from the group consisting of recurring aromatic units having an oxy radical (—O—) and a carbonyl radical (—CO—), which aromatic polyester has an optical anisotropy-creating temperature (liquid crystal onset) of [213° C.] 223° C. to 400° C.

2. The aromatic polyester as claimed in claim 1, wherein the other recurring aromatic dicarbonyl units (ii) are selected from the group consisting of dicarboxyl residues of isophthalic acid, terephthalic acid, naphthalene-1,5-dicarboxylic acid, 4,4'-biphenyldicarboxylic acid, diphenylether-4,4'-dicarboxylic acid, diphenyl sulfon-4,4'-dicarboxylic acid, diphenylketone-4,4'-dicarboxylic acid, and 2,2'-diphenylpropane-4,4'-dicarboxylic acid.

3. The aromatic polyester as claimed in claim 1, wherein the recurring aromatic units for the aromatic oxycarbonyl ingredient (c) are selected from the group consisting of oxycarbonyl residues of p-hydroxybenzoic acid, m-hydroxybenzoic acid, 4-hydroxy-4'-carboxydiphenyl ether, 4-hydroxy-4'-carboxybiphenyl, and 1-hydroxy-4-naphthoic acid.

4. The aromatic polyester as claimed in claim 1, in which the aromatic dicarbonyl ingredient (a) consists of at least one member selected from the group consisting of the recurring aromatic units of the formula (I) and the recurring aromatic units of the formula (II), the aromatic dioxy ingredient (b) consists of recurring aromatic units (iii) of the formula (III), and the aromatic oxycarbonyl ingredient (c) consists of the recurring aromatic units of the formula (IV):

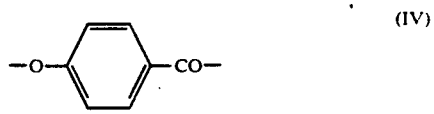

(IV)

and in an amount of 1 to 90 molar % based on the total molar amount of the ingredients (a), (b) and (c).

5. The aromatic polyester as claimed in claim 1, wherein the aromatic dicarbonyl ingredient (a) consists of at least one member (i) selected from the group consisting of the recurring units of the formula (I), the recurring units of the formula (II) and the recurring units (ii) of the formula (V):

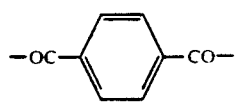
(V)

the molar ratio of the recurring units (i) to the recurring units (ii) in the aromatic dicarbonyl ingredient (a) being from 10:90 to 99:1; the aromatic dioxy ingredient (b) consists of the recurring units (iii) of the formula (III); and the aromatic oxycarbonyl ingredient (c) is not present.

6. The aromatic polyester as claimed in claim 1, wherein the aromatic dicarbonyl ingredient (a) consists of at least one member (i) selected from the group consisting of the recurring units of the formula (I) and the recurring units of the formula (II) and the recurring units (ii) of the formula (V):

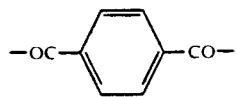
(V)

the molar ratio of the recurring units (i) to the recurring units (ii) in the aromatic dicarbonyl ingredient (a) being 10:90 or more; the aromatic dioxy ingredient (b) consists of the recurring units (iii) of the formula (III); and the aromatic oxycarbonyl ingredient (c) consists of the recurring units of the formula (IV):

(IV)

and in an amount of 1 to 75 molar % based on the total molar amount of the ingredients (a), (b) and (c).

7. The aromatic polyester as claimed in claim 1, wherein the aromatic dicarbonyl ingredient (a) consists of the recurring units of the formula (I) and the formula (II), and the recurring units of the formula (V):

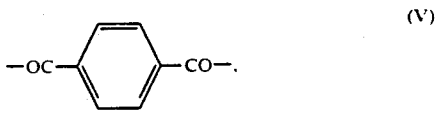
(V)

the total molar % of the recurring units of the formulae (I) and (II) based on the total molar amount of the recurring units of the formulae (I), (II) and (V) being from 10% to 99%, the aromatic dioxy ingredient (b) consists of the recurring units of the formula (III), and the aromatic oxycarbonyl ingredient (c) consists of the recurring units of the formula (IV):

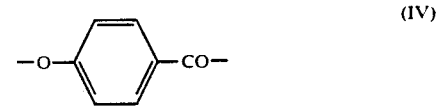
(IV)

the molar % of the aromatic oxycarbonyl ingredient (c) based on the total molar amount of the aromatic dicarbonyl ingredient (a) and the aromatic oxycarbonyl ingredient (c) being from 1 to 85 molar %.

* * * * *